United States Patent [19]
Houston

[11] 3,870,474
[45] Mar. 11, 1975

[54] REGENERATIVE INCINERATOR SYSTEMS FOR WASTE GASES

[76] Inventor: Reagan Houston, 146 Curtis Dr., Avon Lake, Ohio 44012

[22] Filed: Nov. 13, 1972

[21] Appl. No.: 305,997

[52] U.S. Cl. ........... 23/277 C, 23/277 R, 23/288 R, 23/262, 432/180, 432/181, 165/10, 165/4, 423/210, 110/8 A, 252/416, 55/DIG. 30
[51] Int. Cl. ............................. F23g 7/06, B01j 9/02
[58] Field of Search ...... 23/277 C, 277, 288 R, 262; 252/416; 432/180, 181; 165/4, 5, 6, 7, 8, 10; 55/58; 423/210; 110/8 A

[56] References Cited
UNITED STATES PATENTS

| | | | |
|---|---|---|---|
| 2,121,733 | 6/1938 | Cottrell | 165/4 X |
| 2,365,893 | 12/1944 | Mather et al. | 252/416 X |
| 3,085,379 | 4/1963 | Kiyonaga et al. | 55/58 X |
| 3,207,493 | 9/1965 | Swain | 432/180 |

*Primary Examiner*—James H. Tayman, Jr.
*Attorney, Agent, or Firm*—Donnelly, Maky, Renner & Otto

[57] ABSTRACT

The regenerative incinerator systems of the present invention provide means for purging of regenerative incinerators of odorous or untreated air or gas and reintroducing such purged air back into the system to remove any contaminants therefrom prior to being discharged into the atmosphere. In one form of the invention, three regenerators are provided, two of which are in operation at any one time while the third regenerator receives a small purge of purified air to force out any untreated or contaminated air therefrom and discharge into a combustion chamber where the contaminants are oxidized and the purged air is mixed with the main air flow for discharge from the system with the main air flow. In another form of the invention, a partially evacuated surge chamber may be used for removal of the contaminated air from the regenerators when the flow of air through the regenerators is reversed. The contaminated air received from the regenerators is evacuated from the surge chamber in preparation for the next cycle and discharged through the inlet regenerator into a combustion chamber for oxidation of the contaminants therein and mixing of the purified air with the main air flow for discharge from the system.

20 Claims, 10 Drawing Figures

REGENERATIVE INCINERATOR SYSTEMS FOR WASTE GASES

BACKGROUND OF THE INVENTION

This invention relates generally as indicated to regenerative incinerator systems for waste gases, and more particularly, to various systems for purging regenerative incinerators of odorous or untreated air and impurities and treating the purged air to eliminate emission of even small amounts of untreated air from the system.

An important consideration in the preservation and improvement of the environment is the control and elimination of undesirable odors and impurities from the air such as occur as byproducts from numerous manufacturing operations. A common way of eliminating them is by oxidizing the contaminants by incineration. Typical contaminants which can readily be eliminated by incineration are objectionable fumes and odors including hydrogen sulfide, solvents, hydrocarbons, paint vapors, chlorinated hydrocarbons, gasoline vapors, carbon monoxide, and other undesirable gaseous impurities. Incineration occurs when the air containing sufficient oxygen is heated to a high enough temperature and for a sufficient length of time to convert the objectionable organic vapors or impurities to such harmless gases as carbon dioxide and water vapor.

Heat may be provided simply by burning a fuel such as natural gas within the air stream. However, because of the high cost of fuel, it is preferred that as much of the heat be recovered as possible. One way of recovering some of the heat is to use a heat exchanger for transfer of heat from the hot air leaving the combustion chamber to the incoming air. However, such heat exchangers are generally relatively expensive, and the thermal recovery efficiency of such heat exchangers is also not very high, whereby large amounts of fuel are still required to be consumed.

The most economical and practical way of incinerating odors and other impurities in the air is to use a thermal regenerative incinerator which generally comprises two regenerators each containing a suitable heat retention packing material such as quartz gravel, and a combustion chamber interposed therebetween. The air is first caused to flow in one direction through the regenerators for a period of time, and after a few minutes, the flow of air is reversed through the regenerators to make use of the heat which is transferred to the packing material during passage of the heated air therethrough to preheat the incoming gases. Such regenerators are commonly used in metallurgical furnaces, low temperature air separation plants, and in the chemical industry.

The major drawback to the use of such regenerators is that when the air flow is reversed every few minutes, the untreated air which just entered one of the regenerators prior to the flow reversal is expelled without passing entirely through the regenerators, thus allowing untreated or partly treated air to be expelled into the atmosphere. In the case of odors, one volume of untreated air will oftentimes impart an objectionable odor to many thousands of volumes of clean air.

Another problem is that ordinary combustion produces local temperatures exceeding 2000°F, which causes the nitrogen in the air to react with oxygen and form nitric oxide and nitrogen dioxide. Although incinerators generate a relatively small amount of these objectionable gases, the preservation and improvement of the environment may require the eliminating of even these small amounts in the atmosphere.

SUMMARY OF THE INVENTION

With the foregoing in mind, it is a principal object of this invention to provide various regenerative incinerator systems for purging regenerative incinerators of odorous or untreated air prior to discharge of any air therefrom into the atmosphere.

Still another object is to provide such systems in which the purged air is reintroduced back into the system to remove any contaminants from the purged air prior to being discharged into the atmosphere.

Still another object is to provide such systems in which a catalyst may be used to reduce the temperature at which certain impurities will be oxidized.

Still another object is to provide such systems which allow for the removal of NO and $NO_2$ from the air.

In one form of the invention to be described in greater detail hereinafter, the system includes three regenerators thus permitting any two of the regenerators to be in operation at any one time while the third regenerator receives a small purge of treated or purified air to force out any untreated or contaminated air from the third regenerator and discharge into a combustion chamber where the contaminants are oxidized and the purged air is mixed with the main air flow for discharge from the system with the main air flow. Alternatively, a small amount of hot and purified air from the combustion chamber may be caused to flow through the regenerator to be purged and through a blower which mixes the purged air with the incoming contaminated air for recirculation through the system.

When the first cycle is completed, as determined by a timer or by temperatures, the flow of odorous or contaminated air is reversed through the regenerator from which the purified air was previously being discharged for preheating of the contaminated air during passage through such regenerator prior to introduction into the combustion chamber where any remaining contaminants are incinerated. From the combustion chamber the purified air is discharged through the previously purged regenerator for cooling of the purified air and transfer of heat from the purified air to the packing material contained in such purged regenerator. The regenerator which received the contaminated air during the previous cycle does not receive the main air flow during this cycle but is purged of any trace of contaminated air remaining therein in preparation for discharge of the purified air therethrough during the next cycle, and so on.

In another form of the invention, a partially evacuated surge chamber may be substituted for the third regenerator, with suitable valving being provided for alternately selectively connecting the evacuated surge chamber to the other two regenerators for removal of any contaminated air from the regenerators when the flow of air through the regenerators is reversed. A check valve prevents outside air from entering the evacuated surge chamber while contaminated air is being drawn into the surge chamber from one or the other of said regenerators, and suitable means is also provided for evacuating the surge chamber to remove the contaminated air received from the regenerators in preparation for the next cycle. The contaminated air from the surge chamber is discharged to the inlet regenerator and then into the combustion chamber for oxidation of the contaminants therein and mixing of the purified air with the main air flow for discharge from the system into the atmosphere.

In still another form of the invention, clean purge air is used to purge the various compartments of a rotary heat exchanger prior to discharge of the clean air therethrough to prevent any contaminated air from being discharged with the clean air.

While it is preferred that the purged air be recycled through the various regenerator systems to remove the contaminants therefrom, it will be appreciated that the purged air may be purified externally from the regenerator systems if desired.

The present invention also contemplates the use of catalysts both to reduce the temperature at which the contaminants are oxidized and to remove NO and $NO_2$ from the air. Plugging of the regenerator packing material by the contaminants may also be eliminated by withdrawing some of the packing material from the bottom of the regenerators and replacing the withdrawn packing material from the top with fresh or cleaned packing material without disturbing the operation of the system.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENTS

Figure 1:
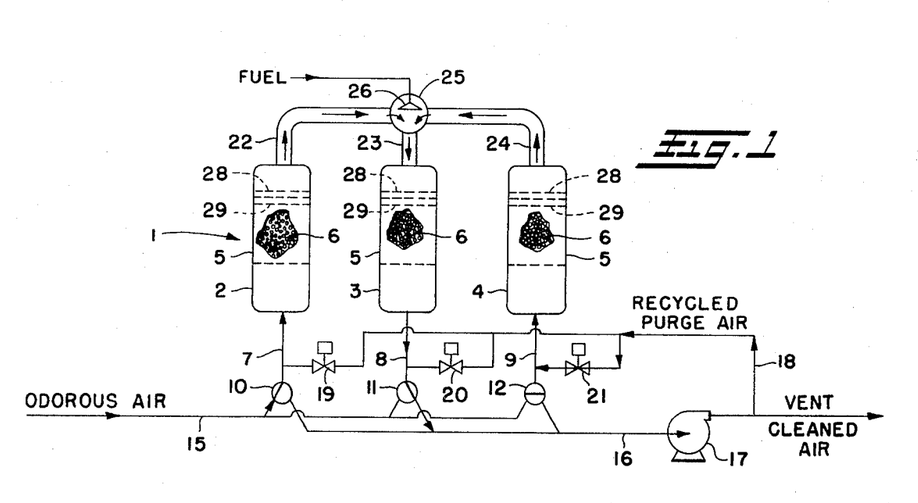
FIGS. 1 through 3 are schematic flow diagrams showing the various cycles of operation of one form of regenerative incinerator system in accordance with this invention including mechanism for purging contaminated air from each of the regenerators prior to discharge of the purified air therethrough to prevent any contaminated air from being discharged with the purified air.
Figure 2:
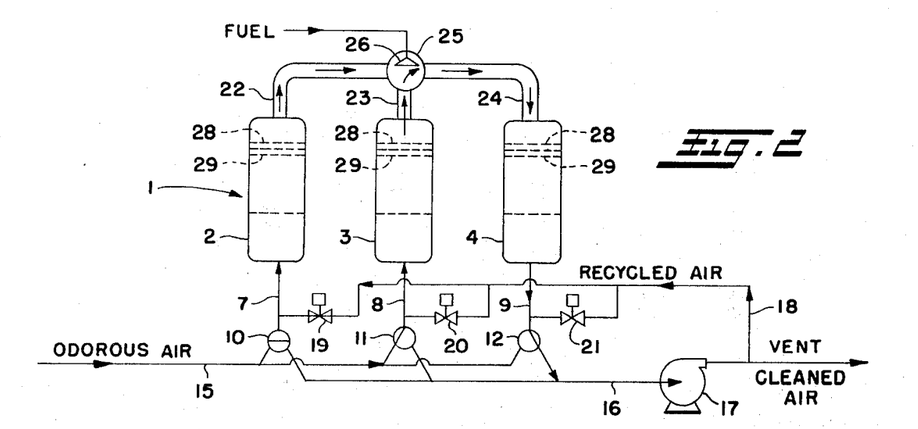
Figure 3:
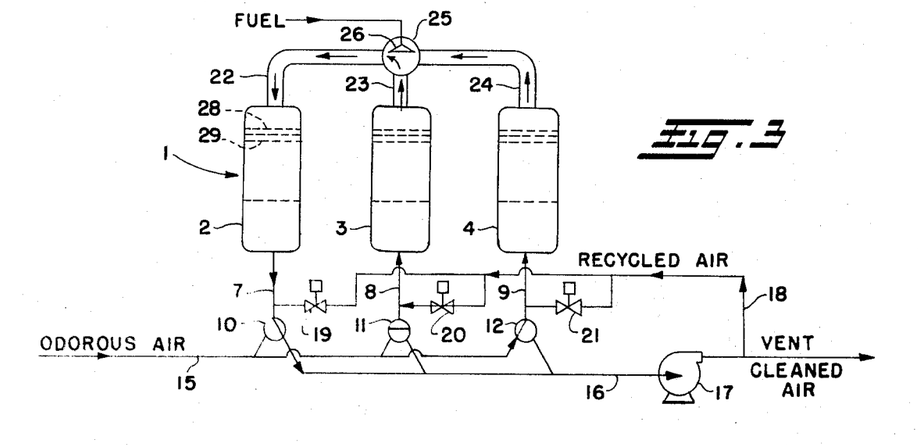

Referring now in detail to the drawings and initially to FIGS. 1 through 3 thereof, there is shown one form of regenerative incinerator system 1 in accordance with this invention which desirably comprises three regenerators 2, 3 and 4 each consisting of a regenerator shell 5 filled with a suitable heat retention packing material 6 such as quartz gravel which is naturally occurring and relatively inexpensive. Other packing materials such as metal or formed ceramic pieces may also be used where the additional expense is justified.

Connected to one end of each of the regenerators 2, 3 and 4 are conduits 7, 8 and 9, respectively, each containing a suitable three-way valve 10, 11, and 12 which may be positioned in any one of three positions for selectively communicating such regenerators with an inlet conduit 15 for the contaminated air, a discharge conduit 16 for the purified air, or blocking communication with both of such conduits 15 and 16. An exhauster fan 17 may be connected to the discharge conduit 16 for the purified air to assist in venting the purified air to the atmosphere, and a purge air conduit 18 is connected to the discharge conduit 16 for selectively supplying a small charge of treated or purified air to any one of the regenerators 2, 3 and 4 upon opening the respective power control valves 19, 20 and 21 which provide communication between the purge air conduit 18 and the respective regenerator conduits 7, 8 and 9.

The other ends of the regenerators 2, 3 and 4 have additional conduits 22, 23 and 24 connected thereto providing communication with a common combustion chamber 25. Contained within the combustion chamber 25 is a burner 26 for injection of fuel into the combustion chamber and mixing of the fuel with the air received from the regenerators to incinerate any objectionable fumes and odors and particulate material in the air which converts essentially all of them to harmless carbon dioxide and water vapor. If the impurities in the air contain sulfur or chlorine, then the purified air may contain $SO_2$ or HCl which can be removed by another step.

In the usual regenerative system, the flow of air through the regenerators is reversed every few minutes so that the heat which is extracted by the packing material from the hot gases passing therethrough can be used to preheat the incoming gases thereby substantially reducing the amount of fuel required to heat the contaminated air to the desired purification temperature. This has the objection that when the flow of air is reversed through the regenerators, the contaminated air which just entered one of the regenerators is, immediately after the flow reversal, expelled into the atmosphere without having passed entirely through the regenerative system. In the case of odors, for example, one volume of untreated air may impart an objectionable odor to many thousands of volumes of clean air.

The regenerative incinerator system 1 shown in FIGS. 1 through 3 prevents expulsion of any untreated or partly treated air from the system during such reversals of the main air flow through the system by utilizing only two of the regenerators for passage of the main air flow during any one cycle while purging the third regenerator of any contaminated air for use of such third regenerator to discharge the purified air to the atmosphere in the next cycle. As shown in FIG. 1, the three-way valves 19, 20 and 21 are positioned so that the contaminated air from inlet conduit 15 passes into the bottom of the first regenerator 2 and up through the packing material 6 contained therein to preheat or warm the incoming air. When the air finally leaves the first regenerator 2, its temperature may be as high as 1450°F. in which event most of the odor or other undesirable impurities will be oxidized before the air leaves the first generator.

The heated air leaving the first regenerator 2 enters the combustion chamber 25 where fuel may be injected into the chamber and mixed with the air to cause combustion with the excess oxygen and raise the average temperature of the air to about 1500°F to oxidize any of the remaining odors and contaminants in the air. Since only a small temperature rise is needed, only a small amount of fuel is required to heat the air to the final desired temperature.

From the combustion chamber 25 the purified heated air may pass through a suitable air mixing device such as a baffle or orifice to even out the temperature of the air prior to entering the second regenerator 3. As the heated air passes through the packing material contained in the second regenerator 3, the heat is transmitted from the air to the packing material for use in preheating the incoming air during the next cycle when the air flow through the system is reversed in a manner to be subsequently fully described. From the second regenerator 3 the purified air passes through the three-way valve 11 into the discharge conduit 16 and is vented to the atmosphere except for a small portion of the purified air which is used to purge the third regenerator 4 of any contaminated air upon opening the power control valve 21. The purified purge air desirably enters the conduit 9 leading to the third regenerator 4 just above the three-way valve 12 so that the contaminated air in the valve 12 and conduit 9 as well as in the regenerator 4 is forced out of the regenerator by the purge air and into the combustion chamber 25 for mixing with the air from the first regenerator 2 and also with the fuel to heat the air to the purification temperature for oxidation of the contaminants as previously described.

The purified purge air may be caused to flow continuously through the third regenerator 4 during the entire cycling of the main air flow through the other two regenerators 2 and 3, or only until the third regenerator is purged sufficiently. It is estimated that a purge air flow of approximately 10% of the main air flow will fully purge the regenerators of any contaminated air, and the purge air will not excessively cool the packing material in such regenerators.

Upon completion of the first cycle, as determined by a timer or by temperatures, the various three-way valves 10, 11 and 12 may be automatically repositioned so that the contaminated incoming air enters the second regenerator 3 to make use of the heat retained by the packing material therein to preheat the incoming air, and all of the purified air leaving the combustion chamber 25 is directed out through the now purged third regenerator 4 as shown in FIG. 2. The three-way valve 10 for the first regenerator 2 is positioned to block communication with both the inlet conduit 15 and discharge conduit 16, and its associated power control valve 19 is opened for passage of a small purge of purified air through the first regenerator 2 to ready it for discharge of the purified air therethrough during the next cycle.

When the second cycle is completed, the three-way valves 10, 11 and 12 are again repositioned so that all of the incoming air enters the third regenerator 4 and all of the purified air leaves through the first regenerator 2, with the second regenerator 3 connected to the purge air conduit 18 through open valve 20 for purging of the contaminated air therefrom as shown in FIG. 3, and so on.

If desired, a suitable combustion catalyst may be placed in the warmest part of the regenerators as a horizontal layer 28 to cause the contaminants in the air to be oxidized at a lower temperature to further reduce fuel consumption. Likewise, a proper catalyst may also be made a part of the regenerator packing material as a horizontal layer 28 or 29 at the proper temperature level to remove any NO or $NO_2$ from the air which may either be generated in the combustion chamber of the system or be one of the contaminants in the feed gas.

While three such regenerators 2, 3 and 4 are shown in the regenerative incinerator system 1 of FIGS. 1 through 3, it will be apparent that more than three regenerators may be provided in the system so long as at least one of the regenerators is being purged of contaminated air during passage of the main air flow through the other regenerators.

Figure 4:
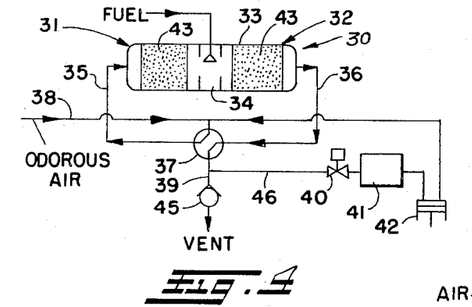
FIGS. 4 and 5 are schematic flow diagrams of another form of regenerative incinerator system in accordance with this invention.
Figure 5:
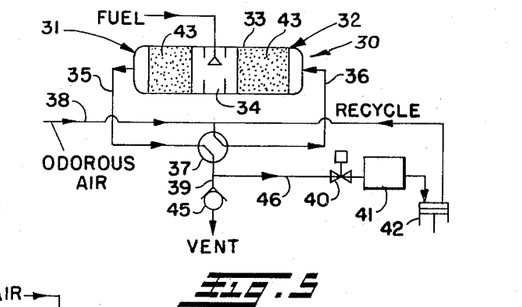

Moreover, a regenerative incinerator system including only two regenerators can be made to operate satisfactorily without discharging untreated or partially treated air to the atmosphere during reversal of the air flow through the system by providing suitble means for effectively disposing of such contaminated air remaining in the regenerators immediately after flow reversal. Such a system 30 is schematically illustrated in FIGS. 4 and 5, wherein two regenerators 31 and 32 are shown contained in the same shell or vessel 33 with a combustion chamber 34 therebetween. Of course, it will be apparent that such regenerators 31 and 32 may comprise separate units connected to a common combustion chamber as previously illustrated.

In any event, the ends of the regenerators 31 and 32 of the FIGS. 4 and 5 embodiment not in communication with the combustion chamber 34 have conduits 35 and 36 leading therefrom to a four-way valve 37 which alternately connects the respective regenerators 31 and 32 to the inlet conduit 38 for the contaminated supply air and the discharge conduit 39 for purified air. Also connected to the discharge conduit 39 through a power operated valve 40 is a vacuum surge tank 41 which may be evacuated as by actuation of a vacuum pump 42.

During normal operation of the regenerative system 30 with the four-way valve 37 positioned as shown in FIG. 4, the incoming contaminated air enters the regenerator 31 on the left and passes through the packing material 43 therein for preheating of the incoming air and discharge into the combustion chamber 34 where fuel is injected and mixed with the air to cause combustion and oxidation of the remaining contaminants in the air. From the combustion chamber 34 the purified air passes through the packing material 43 in the regenerator 32 on the right which extracts heat from the purified air prior to discharge into the discharge conduit 39 and venting to atmosphere.

The power operated valve 40 leading to the vacuum surge tank 41 is closed except at the beginning of each new cycle when the four-way valve 37 is repositioned to cause a reversal in the flow of incoming air through the regenerators. Thus, for example, when the four-way valve 37 is repositioned as shown in FIG. 5 to direct the incoming contaminated air into the regenerator 32 on the right and permit exit of the purified air from the regenerator 31 on the left, the power operated valve 40 is opened to permit the evacuated surge tank 41 to draw in any untreated or partially treated air contained within the regenerator 31 on the left. A check valve 45 in the discharge conduit 39 downstream of the conduit 46 leading to the vacuum surge tank 41 prevents outside air from being drawn into the surge tank.

The vacuum surge tank 41 is made large enough and has sufficient vacuum such that the contaminated air in the regenerator on the downstream side of the combustion chamber at the beginning of each new cycle will be drawn into the surge tank. Upon removal of such contaminated air, the power operated valve 40 is closed and the vacuum pump 42 evacuates the surge tank 41 in preparation for the next cycle. The vacuum pump 42 may return the evacuated air from the surge tank 41 back to the contaminated air inlet conduit 38 as shown or such air may be discharged directly into the combustion chamber 34.

Such a regenerator system 30 as shown in FIGS. 4 and 5 may of course include a combustion catalyst to lower the temperature at which the contaminants are oxidized, and/or a suitable catalyst may also be used to remove NO and $NO_2$ from the air as previously described.

Figures 6, 7, 8, 9, 10:
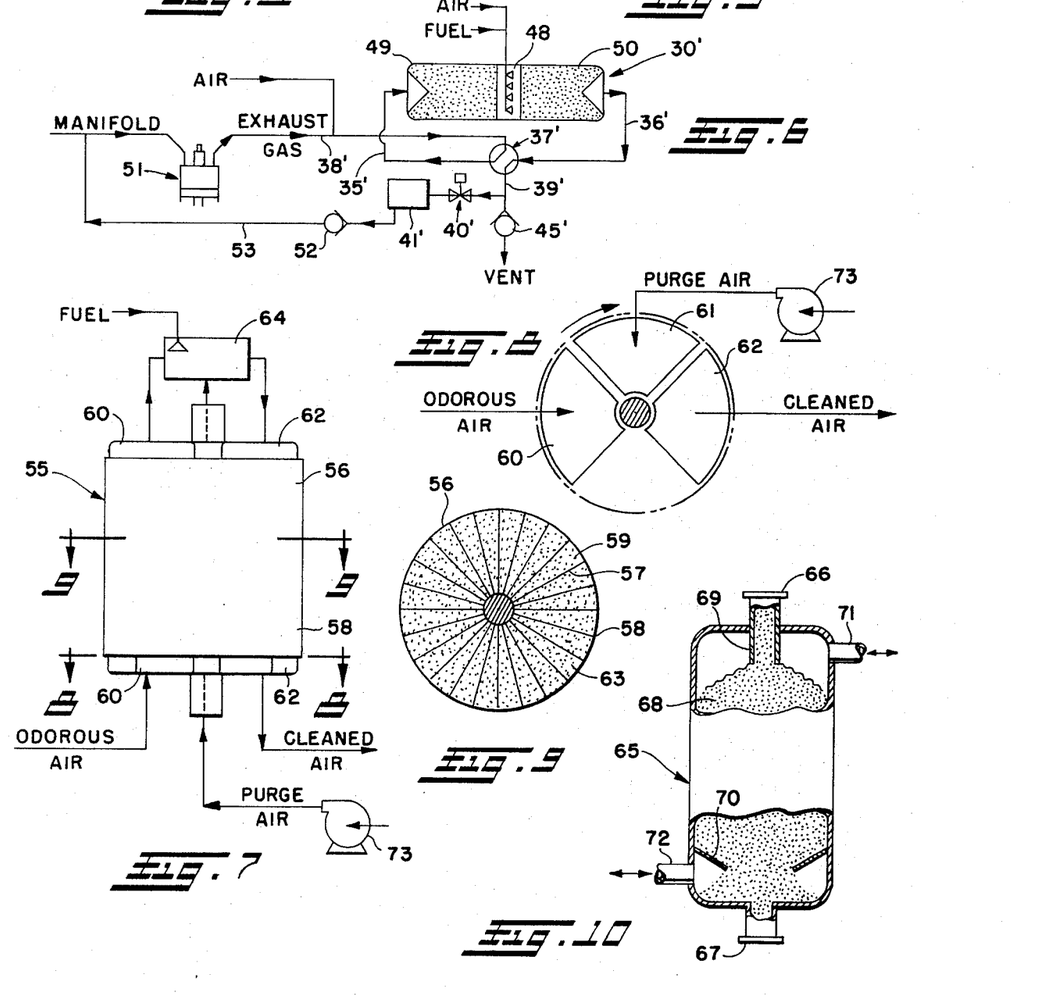
FIG. 6 is a schematic flow diagram of still another form of regenerative incinerator system in accordance with this invention.
FIG. 7 is a schematic flow diagram of yet another regenerative incinerator system in accordance with this invention.
FIGS. 8 and 9 are transverse sections through the regenerator of FIG. 6 taken on the planes of the line 8—8 and 9—9, respectively.
FIG. 10 is a schematic illustration of a modified form of regenerator which may be incorporated in the various regenerative incinerator systems of the present invention.

While FIGS. 4 and 5 show a separate combustion chamber 34 between the two regenerators 31 and 32, it has been found that if the fuel is introduced at several points in a combustion zone 48 between two regenerator sections 49 and 50 such as shown in FIG. 6, a separate combustion chamber and gas mixing devices may not be necessary. Moreover, if such a regenerator system is used with an internal combustion engine 51, the surge tank 41' can be connected to the intake manifold of the engine as further shown in FIG. 6 thereby eliminating the need for a vacuum pump. A check valve 52 disposed in the conduit 53 leading from the surge tank 41' to the intake manifold prevents flow of air in the reverse direction. Also, since the raw exhaust gases from an internal combustion engine generally contain an excess of fuel and a deficiency of oxygen, it may only be necessary to introduce air into the exhaust gases either before the exhaust gases reach either regenerator or at the combustion zone 48 between the two regenerator sections 49 and 50 or both to support combustion and produce the desired amount of heat to oxidize all impurities. The regenerator system 30' of FIG. 6 is applicable to any chemical process where the surge tank 41' can be connected to a convenient process point where the pressure is below the pressure in the regenerators. Otherwise, the details of construction and operation of the regenerator system 30' shown in FIG. 6 is substantially the same as the system 30 of the FIGS. 4 and 5 embodiments, and the same reference numerals followed by a prime symbol ' are used to designate like parts.

The same principles of operation previously described are equally applicable to rotary heat exchangers for gas incinerators. Such a rotary heat exchanger 55 is shown in FIGS. 7 through 9 and comprises a rotor 56 including a plurality of radial plates 57 surrounded by an outer shell 58 to form a plurality of compartments 59 which successively communicate with plural pairs of circumferentially spaced fixed plenum chambers 60, 61 and 62 located at opposite ends of the rotor during rotation of the rotor. One of the plenum chambers 60 receives the incoming contaminated air for passage through the various compartments 59 moving slowly therepast to pick up heat from the walls of the compartments and the packing material 63 contained within the compartments.

The heated air leaving the compartments 59 enters the other stationary plenum chamber 60 at the other end of the rotor for discharge into a combustion chamber 64 where fuel is mixed with the air to cause combustion and oxidation of any remaining contaminants in the air. From the combustion chamber 64 the purified air is fed to another stationary plenum chamber 62 circumferentially spaced from the plenum chamber 60 in the direction of rotation of the rotor for passage through the compartments 59 in the reverse direction as the compartments move therepast to transfer heat from the purified air back to the walls of the compartments and the fill material contained therein. The purified air leaving the compartments 59 is received by the other plenum chamber 62 and discharged into the atmosphere.

Between these two pairs of plenum chambers 60 and 62 in the direction of rotation of the rotor 56 is still another pair of stationary plenum chambers 61 which receive from blower 73 a small flow of clean air or purge air from the purified air discharge conduit for purging any contaminated air from the compartments 59 before they move into communication with the clean air plenum chambers 62. The purge air passing through the compartments is discharged into the combustion chamber 64 so that any contaminants therein are also oxidized to purify the air and such purified air is then discharged along with the main air flow from the combustion chamber 64 through the purged compartments 59 and purified air plenum chambers 62. Such a rotary heat exchanger 55 may also include a combustion catalyst and/or NO and $NO_2$ decomposition catalyst as desired.

During passage of the contaminated air through the packing material in the regenerators, plugging of the regenerators may occur due to solids contained in the contaminated air or solids which are formed during combustion. Carbon and soot may be cleaned off the packing material as by operating the regenerators at a higher temperature for a few minutes to oxidize the carbon. However, such operation would require more expensive materials of construction to withstand the higher temperatures.

Alternatively, regenerators 65 may be used which are provided with removable flanges 66, 67 on the top and bottom as shown in FIG. 10 to permit withdrawal of some of the packing material 68 from the bottom flange 67 and adding of fresh or cleaned packing material through the top flange 66 without disturbing the continuous operation of the regenerator. In this way, not only may the packing material be removed for cleaning, but the downward movement of the packing material within the regenerators during withdrawal may disturb the packing material sufficiently to break loose any carbon or soot deposits so that they can be blown out of the regenerators into the combustion chamber where they are oxidized along with the other contaminants in the air. Suitable pipe 69 or baffle 70 may also be provided in the regenerators adjacent the air passages 71, 72 therein to prevent the packing material from blocking such passages.

Catalysts may also be used with such cleanable regenerators, but in that event the catalyst and regenerator packing material should desirably be the same material such as alumina balls impregnated with copper, manganese or other material.

From the foregoing, it will now be apparent that the various regenerative incinerator systems of the present invention provide for effective control against the emission of any contaminants from the systems even when the air flow through the systems is reversed. Suitable combustion catalysts may also be utilized to reduce the temperature at which the contaminants are oxidized, and a proper catalyst may also be placed in the regenerators at the proper temperature level for removing any undesirable NO or $NO_2$ from the air.

A combustion chamber of the required size and shape is desirably included in the various systems to assure complete mixing and sufficient residence time for complete oxidation of the contaminants. The temperature of the air is generally controlled by adjusting the flow rate of the fuel to the combustion chamber. However, in some cases the contaminated air contains sufficient combustible material such as paint solvent or fuel that no additional fuel is required to be added to the air, and in fact, a coolant may be required to cool the air either as it passes through the regenerator packing material or after it has been introduced into the combustion chamber. The coolant may either be indirect through a heat exchanger or the direct admission of air.

I claim:

1. A regenerative incinerator system comprising a plurality of regenerators each containing packing material, directing means for alternately directing the contaminated air or gas through said regenerators first in one direction and then in the reverse direction to purify the contaminated air and transfer heat from the packing material to the air and vice versa, a combustion chamber common to all of said regenerators for receiving the air passing from one regenerator to another to assure complete oxidation of the contaminants in the air prior to being discharged from the system, and purging means for purging said regenerators of any contaminated air remaining in said regenerators when the flow of air through said regenerators is reversed and reintroducing such purged air back into said combustion chamber to remove the contaminants from the purged air prior to being discharged from the system.

2. The system of claim 1 further comprising means for injecting fuel into said combustion chamber and mixing the fuel with the air to cause combustion for raising the temperature of the air sufficiently to oxidize any contaminants remaining in the air.

3. The system of claim 1 wherein there are at least three of said regenerators each having one end always in open communication with said combustion chamber, said directing means being operative to direct the main flow of air through at least two of said regenerators during any one cycle while said purging means purges at least one of said regenerators of any contaminated air in preparation for the next cycle.

4. The system of claim 3 wherein said directing means is operative during the next cycle of operation to redirect the main air flow for discharge from the regenerator which was purged of any contaminated air during the previous cycle and introduce the main flow of incoming air during such next cycle into the regenerator from which the main flow of air was discharged during the previous cycle, and said purging means is operative to purge the regenerator which was receiving the main flow of incoming air during such previous cycle of contaminated air during the next cycle in preparation for use during still another cycle.

5. The system of claim 3 wherein said purging means is operative to direct a small flow of treated air through the regenerator being purged and mix the purged air leaving the regenerator being purged with the incoming air flow for processing through said regenerators.

6. The system of claim 1 which is used to purify the exhaust gases from an internal combustion engine, said purging means being operative to direct the purged air from the regenerator being purged to the intake manifold of such internal combustion engine.

7. The system of claim 6 further comprising means for introducing air into the exhaust gases from the internal combustion engine to provide oxygen for oxidation of the contaminants in the exhaust gases.

8. The system of claim 3 wherein said means for purging said regenerators comprises first valve means for blocking off the main flow of air through the regenerator being purged, and second valve means for directing pure air or a portion of the purified air leaving another regenerator back through the regenerator being purged to remove any contaminated air therefrom.

9. The system of claim 8 wherein said purging means is operative to direct the purged air from the regenerator being purged to said combustion chamber where it is mixed with the main air flow and the contaminants therein are oxidized prior to being discharged from the system.

10. The system of claim 3 further comprising means for introducing air or fuel into said combustion chamber to facilitate combustion of such contaminants.

11. The system of claim 3 wherein said regenerators contain a combustion catalyst to cause oxidation of the contaminants in the air at a lower temperature.

12. The system of claim 3 wherein said regenerators contain a layer of a suitable catalyst at the proper temperature level for removing any NO or $NO_2$ from the air.

13. The system of claim 1 wherein said regenerators include removable top and bottom flanges to permit withdrawal of some of the packing material from the bottom and adding of fresh or cleaned packing material through the top without disturbing the continuous operation of the system.

14. The system of claim 13 further comprising baffles adjacent the air passages in said regenerators to prevent the packing material from blocking said passages.

15. A regenerative incinerator system comprising at least two regenerators each containing packing material, directing means for alternately directing the contaminated air or gas through said two regenerators first in one direction and then in the reverse direction to purify the contaminated air and transfer heat from the packing material to the air and vice versa, and purging means for purging said two regenerators of any contaminated air remaining in said two regenerators when the flow of air through said regenerators is reversed, said purging means comprising a vacuum surge tank, valve means connecting said vacuum surge tank to the regenerator from which the air is being discharged from the system at the beginning of each reversal of the flow of air through said two regenerators to withdraw any contaminated air contained within said two regenerators into said tank, check valve means for preventing outside air from being drawn into said surge tank with the air from said two regenerators, and pump means for evacuating said tank after purging of said two regenerators of contaminated air in preparation for the next cycle.

16. The system of claim 15 further comprising means for mixing the air which is evacuated from said tank with the incoming air for processing through said two regenerators.

17. The system of claim 15 further comprising a common vessel for said two regenerators with a combustion chamber therebetween.

18. The system of claim 15 wherein said system is used to purify the exhaust gases from an internal combustion engine, and means are provided for connecting said tank to the intake manifold of such internal combustion engine to provide the vacuum required to evacuate the tank of air.

19. The system of claim 18 further comprising means for introducing air into the exhaust gases to support combustion for oxidation of the contaminants in the exhaust gases.

20. The system of claim 15 further comprising a combustion chamber common to said two regenerators for receiving the air passing from one of said two regenerators to the other to assure complete oxidation of the contaminants in the air prior to being discharged from the system, said purging means including means for reintroducing the purged air back into said system to remove any contaminants from the purged air prior to being discharged from the system.

* * * * *

REEXAMINATION CERTIFICATE (1441st)

United States Patent [19]

Houston

[11] B1 3,870,474

[45] Certificate Issued Apr. 2, 1991

[54] REGENERATIVE INCINERATOR SYSTEMS FOR WASTE GASES

[75] Inventor: Reagan Houston, Avon Lake, Ohio

[73] Assignee: Salem Industries

Reexamination Request:
No. 90/002,038, Jun. 4, 1990

Reexamination Certificate for:
Patent No.: 3,870,474
Issued: Mar. 11, 1975
Appl. No.: 305,997
Filed: Nov. 13, 1972

[51] Int. Cl.$^5$ .............................................. F23G 7/06
[52] U.S. Cl. ........................... 422/171; 55/DIG. 30; 60/278; 60/296; 110/243; 165/4; 165/10; 422/172; 422/177; 422/178; 422/182; 423/210; 432/180; 432/181
[58] Field of Search .............. 422/171, 172, 175, 177, 422/178; 423/235

[56] References Cited

U.S. PATENT DOCUMENTS

| | | |
|---|---|---|
| 2,121,733 | 6/1938 | Cottrell . |
| 2,365,893 | 12/1944 | Mather et al. . |
| 3,023,836 | 3/1962 | Kasbohm . |
| 3,085,379 | 4/1963 | Kiyonaga et al. . |
| 3,207,493 | 9/1965 | Swain . |
| 3,211,534 | 10/1965 | Ridgway . |
| 3,624,026 | 1/1972 | Kuechler . |

OTHER PUBLICATIONS

The Proctor & Schwartz Brochure of Jan. 1971, "Traps" System.

*Primary Examiner*—Robert J. Hill, Jr.

[57] ABSTRACT

The regenerative incinerator systems of the present invention provide means for purging of regenerative incinerators of odorous or untreated air or gas and reintroducing such purged air back into the system to remove any contaminants, therefrom prior to being discharged into the atmosphere. In one form of the invention, three regenerators are provided, two of which are in operation at any one time while the third regenerator receives a small purge of purified air to force out any untreated or contaminated air therefrom and discharge into a combustion chamber where the contaminants are oxidized and the purged air is mixed with the main air flow for discharge from the system with the main air flow. In another form of the invention, a partially evacuated surge chamber may be used for removal of the contaminated air from the regenerators when the flow of air through the regenerators is reversed. The contaminated air received from the regenerators is evacuated from the surge chamber in preparation for the next cycle and discharged through the inlet regenerator into a combustion chamber for oxidation of the contaminants therein and mixing of the purified air with the main air flow for discharge from the system.

Fig. 1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15-18, 19 and 20 is confirmed.

Claims 2 and 11-12 are cancelled.

Claim 1 is determined to be patentable as amended.

Claims 3-10 and 13-14, dependent on an amended claim, are determined to be patentable.

1. A regenerative incinerator system comprising [a plurality of] *at least three* regenerators each containing packing material, directing means for alternately directing the contaminated air or gas through said regenerators first in one direction and then in the reverse direction to purify the contaminated air and transfer heat from the packing material to the air and vice versa, a combustion chamber common to all of said regenerators for receiving the air passing from one regenerator to another to assure complete oxidation of the contaminants in the air prior to being discharged from the system, and purging means *comprising a fan having an intake connectable to the outlet of the regenerator operating with air flow in said one direction and a outlet connectable to a second one of the regenerators operating with air flow in said reverse direction* for purging said *second one of said* regenerators of any contaminated air remaining [in said regenerators] *therein* when the flow of air through said regenerators is reversed [and] *thereby* reintroducing such purged air back into said combustion chamber *under positive pressure* to remove the contaminants from the purged air prior to being discharged from the system.

* * * * *